United States Patent [19]

Ashmele

[11] 3,709,505

[45] Jan. 9, 1973

[54] SOUND REPRODUCING APPARATUS

[75] Inventor: Anton Ashmele, Trossingen, Germany

[73] Assignee: Trossinger Metallstimmenfabrik Hans Eisen, Trossingen, Germany

[22] Filed: Feb. 4, 1970

[21] Appl. No.: 8,589

[30] Foreign Application Priority Data

Feb. 7, 1969 Germany..................... P 19 06 031.2

[52] U.S. Cl. .................................274/23 R, 274/1 A
[51] Int. Cl. ..............................................G61b 3/10
[58] Field of Search............274/1 A, 7, 9, 25, 29, 34, 274/37

[56] References Cited

UNITED STATES PATENTS

| | | | |
|---|---|---|---|
| 3,383,114 | 5/1968 | Ryan | 274/1 |
| 727,921 | 5/1903 | Emerson et al | 274/35 |

FOREIGN PATENTS OR APPLICATIONS

| | | | |
|---|---|---|---|
| 1,555,555 | 12/1968 | France | 274/1 |
| 1,210,582 | 2/1966 | Germany | 274/1 A |

*Primary Examiner*—William D. Martin, Jr.
*Assistant Examiner*—Charles E. Phillips
*Attorney*—Michael S. Striker

[57] ABSTRACT

A toy phonograph wherein mechanical vibrations of the tone arm in response to tracking by its stylus of a sound groove in a rotating record are transmitted to the loudspeaker diaphragm by means of a two-armed follower which is pivotably mounted on the tone arm and has a shorter arm engaging a contact plate on the central portion of the diaphragm and a longer arm which is biased by a spring to maintain the shorter arm in engagement with the contact plate. The ratio of the pressure with which the stylus engages the record to the pressure between the shorter arm and the contact plate is about three to one and the ratio of the lengths of the two follower arms approximates the ratio of the force with which the stylus bears against the record to the average force with which the spring acts on the longer arm. The point of engagement between the shorter arm and the contact plate of the diaphragm is in line with the axis of the stylus.

10 Claims, 3 Drawing Figures

INVENTOR.
ANTON ASHMELE

BY Michael S. Striker
Attorney

*INVENTOR.*
ANTON ASHMELE

*BY*

SOUND REPRODUCING APPARATUS

BACKGROUND OF THE INVENTION

The present invention relates to sound reproducing apparatus, particularly to improvements in phonographs which can be incorporated in or otherwise used in connection with talking dolls or other types of toy devices.

It is already known to provide the loudspeaker diaphragm of a toy phonograph with a contact plate which is engaged by a portion of the tone arm so that the diaphragm receives mechanical vibrations which are produced when the stylus of the tone arm tracks the sound groove of a rotating record. The tone arm is provided with a suitably configurated vibration-transmitting portion which bears against the contact plate when the record is driven by a spring motor or the like. A drawback of such toy phonographs is that the tone arm must be manufactured with a high degree of precision or, in the absence of such precise finish, the position of the tone arm and/or diaphragm in the fully assembled phonograph must be accurately adjusted by a skilled workman. All this is undesirable when the phonograph is intended to be a low-cost mass-produced apparatus for use in talking dolls or the like. As a rule, the parts of toy phonographs are produced in large quantities and without observation of close tolerances.

It was further found that the quality of sound reproduction (particularly the intensity of sound) in conventional toy phonographs depends on certain other factors, for example, on wobbling of the record during rotation. Such wobbling causes the stylus of the tone arm to move up and down, not as a result of changes in configuration (modulation) of the sound groove, and to thereby affect the quality (particularly the intensity) of reproduced sound. This is attributed to the fact that relatively slow up and down movements of the stylus for reasons other than those due to the configuration of the sound groove cause excessive fluctuations in energy transfer to the diaphragm.

Additional problems arise in toy phonographs wherein a cord is used to wind the motor which rotates the record during reproduction of sound and wherein such cord also serves as a means for effecting return movement of the tone arm to a starting position in which the stylus registers with the forward end of a selected sound groove. In order to avoid damage to the diaphragm (which is constantly engaged by the tone arm), the diaphragm must be movably mounted in the housing of the toy phonograph so that it can yield in response to changes in position of the tone arm when the latter is moved by a spring or the like to return to its starting position. Rigid mounting of a diaphragm which is permanently contacted by the tone arm would result in poor reproduction of sound or damage to the diaphragm during return movement of the tone arm to starting position. On the other hand, resilient mounting of the diaphragm in the housing of a toy phonograph presents other problems, mainly in connection with retention of the tone arm in constant vibration-transmitting engagement with the diaphragm.

Attempts to eliminate the above problems in conventional phonographs for dolls or the like include the provision of a damping device which is installed between the tone arm and the loudspeaker diaphragm and whose function is to prevent transfer of relatively slow changes in position of the tone arm, i.e., of such changes in position which are not due to changes in configuration (depth) of successively tracked portions of a sound groove. The damping device includes two coaxial portions which are telescoped into each other. One of these portions is a sleeve which is coaxially secured to the diaphragm and the other portion is a pin or shaft which is slidable in the sleeve and abuts against a smooth surface of the tone arm. The shaft extends at right angles to the axis of the record. A lubricant is confined between the adjoining surfaces of the sleeve and shaft, and its viscosity is selected in such a way that any slow changes in position of the stylus (such as occur when the tone arm is disengaged from and reengages with the record as well as those which are due to wobbling of the record) are not transmitted to the diaphragm. A drawback of the just described proposal is that the quality of sound reproduction depends on changes in temperature. If the temperature rises, the viscosity of lubricant decreases and the damping device is less likely to properly transmit those vibrations which are due to changes in depth of the sound groove. On the other hand, if the temperature drops and the viscosity of lubricant rises, the damping device is likely to transmit to the diaphragm those movements of the tone arm which are not due to changes in the depth of a sound groove. Moreover, when the temperature rises, the thin-flowing lubricant is likely to escape from the space between the shaft and the surrounding sleeve.

SUMMARY OF THE INVENTION

An object of the invention is to provide a sound reproducing apparatus, particularly a toy phonograph for use in or in connection with dolls or the like, wherein the operation of the device which transmits vibrations from the tone arm to the diaphragm of the loudspeaker is not dependent on changes in temperature.

Another object of the invention is to provide a toy phonograph wherein the device which transmits vibrations to the loudspeaker diaphragm invariably prevents deformation of the diaphragm in response to relatively slow changes in position of the tone arm, particularly those changes which are due to shocks or wobbling of the record.

A further object of the invention is to provide a toy phonograph whose sound reproduction is more satisfactory than the sound reproduction of presently known toy phonographs.

An additional object of the invention is to provide a toy phonograph with a relatively simple, compact and inexpensive device for transmission of mechanical vibrations from the tone arm to the loudspeaker diaphragm and to construct the device in such a way that it requires no accurate adjustment for proper transmission of sound in a mass-produced toy phonograph.

The invention is embodied in a sound reproducing apparatus, particularly in a phonograph for use with toys, which comprises a housing or a like support, a record which is rotatably mounted in the support and is provided with at least one sound groove, a spring motor or analogous means for rotating the record, a tone arm which is movably mounted in the support and is provided with a stylus arranged to track the sound groove and to vibrate the tone arm when the motor rotates the record, a loudspeaker mounted in or on the support, and a damping device for transmitting to the loudspeaker only those vibrations which are due to movements of the stylus in response to changes in the depth of the tracked sound groove. The damping device comprises a follower which is pivotally mounted on the tone arm and abuts against the loudspeaker, and biasing means urging the follower against the loudspeaker. The follower is preferably a two-armed lever the shorter arm of which abuts against a contact plate attached to the central portion of the loudspeaker diaphragm and the longer arm of which is biased by a spring constituting the biasing means and acting between such longer arm and the tone arm to bias the shorter arm against the contact plate. A further spring biases the contact plate against the shorter arm of the follower. The point where the shorter arm of the follower engages the contact plate is preferably in line with an extension of the axis of the stylus. The just described follower can transmit vibrations independently of changes in temperature.

The novel features which are considered as characteristic of the invention are set forth in particular in the appended claims. The improved sound reproducing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
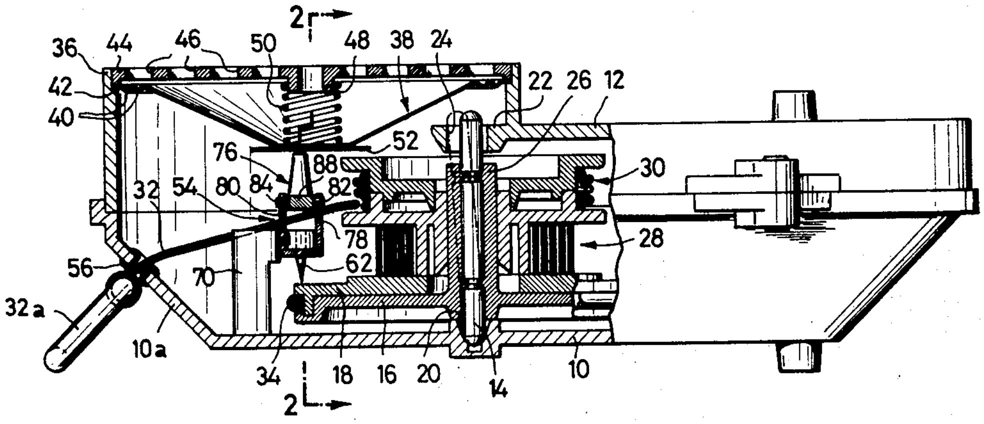
FIG. 1 is a partly elevational and partly vertical sectional view of a sound reproducing apparatus which embodies the invention.

The drawing illustrates a sound reproducing apparatus in the form of a toy phonograph which comprises a housing or support composed of a lower section or base 10 and an upper section or cover 12. A turntable 16 is mounted substantially centrally of the housing in the interior of the base 10 and its shaft 14 has upper and lower end portions which are respectively journalled in the base 10 and cover 12. FIG. 1 shows that the turntable 16 is rather closely adjacent to the bottom wall of the base 10 and that such bottom wall has a conical socket 20 for the lower end portion of the shaft 14. A disk-shaped record 18 having in its upper surface one or more sound grooves is placed onto and secured for rotation to the turntable 16. The latter can be considered as forming part of the record. The cover 12 has an eye 22 which is in line with the socket 20 of the base 10 and is provided with an elongated opening 24 for the upper end portion of the shaft 14. The configurations of the socket 20 and opening 24 are such that the shaft 14 can be tilted between the solid-line and phantom-line positions shown in FIG. 1. Thus, the entire turntable 16 (and the record 18 thereon) can be tilted in response to exertion of a pull on a cord 32 which serves as a means to rewind a torsion spring 28 forming part of a motor which rotates the turntable when the phonograph is in use. The turntable 16 has an integral upwardly extending cylindrical hub 26 which accommodates and is fixed to the shaft 14. The hub 26 is further connected with the innermost convolution of the torsion spring 28 and with a reel 30 which collects the convolutions of the cord 32 when the spring 28 is permitted to dissipate energy (i.e., while the turntable 16 rotates and the tip of a stylus or needle 62 tracks a sound groove of the record 18. The reel 30 is connected with the hub 26 at a level above the spring 28. The periphery of the turntable 16 is provided with a groove for an endless elastic band 34 which is further trained around the pulley of a centrifugal speed regulator for the record 18. This speed regulator is mounted in the right-hand portion of the housing, as viewed in FIG. 1, and may be constructed in a manner as disclosed in my U.S. Pat. No. 3,282,588.

The left-hand portion of the cover 12, as viewed in FIG. 1, is open at its top and comprises a ring-shaped rim 36 which surrounds a frustoconical loudspeaker diaphragm 38. The larger-diameter end of the diaphragm 38 is provided with concentric corrugations 40 and its marginal portion is clampingly secured to the cover 12; this marginal portion is pressed against a shoulder 42 of the rim 36 by the adjacent marginal portion of a disk-shaped lid 44 which overlies the diaphragm 38 and is formed with a large number of apertures 46 for transmission of sound. The inner side of the lid 44 is formed with a centrally located hub 48 serving as a retainer for the upper end convolution of a helical spring 50 which thus reacts against the lid and bears against a contact plate 52 which is secured to the smaller-diameter lower end of the diaphragm 38. The purpose of the spring 50 is to maintain the diaphragm 38 under tension, i.e., to urge the contact plate 52 away from the lid 44. The underside of the contact plate 52 is in sliding engagement with a follower 76 on a tone arm 54 which carries the aforementioned stylus 62 and is tiltably mounted in the housing. Vibrations of the stylus 62 in response to tracking of a sound groove in the record 18 are transmitted to the diaphragm 38 by way of the tone arm 54 and contact plate 52.

The cord 32 extends outwardly through an eye 56 in an inclined portion 10*a* of the base 10 and its outer end is connected with a ring 32*a* serving as a handgrip means and permitting convenient withdrawal of a length of the cord to thereby rewind the spring 28. The inclination of the axis of the eye 56 with reference to the axis of the turntable 16 is such that the latter is automatically tilted in a counterclockwise direction, as viewed in FIG. 1, when the user exerts a pull on the ring 32*a* whereby the upper side of the record 18 moves away from the tip of the stylus 62 and the tone arm 54 can be automatically returned to its normal starting position in which the tip of the stylus registers with the forward end of the sound groove (or of a selected sound groove, depending upon whether the record 18 is provided with a single sound groove or with two or more concentric grooves). The spring 28 stores energy during movement of the ring 32*a* away from the eye 56 and thereupon rotates the turntable 16 and winds the cord 32 onto the reel 30 when the ring 32*a* is released.

Figure 2:
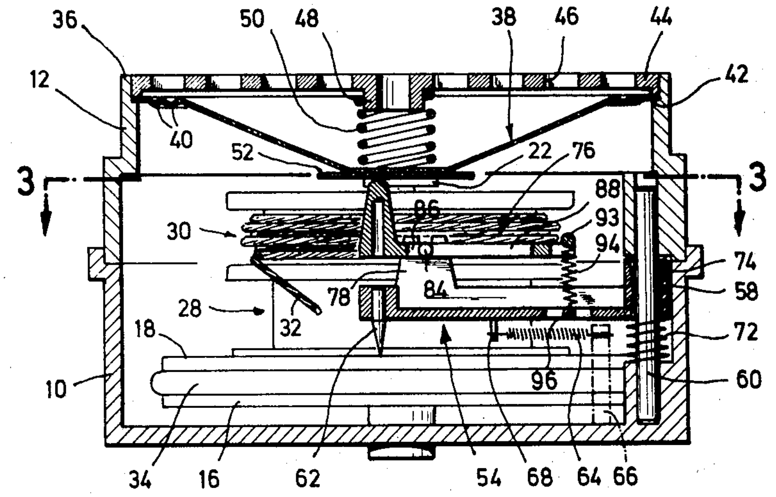
FIG. 2 is an enlarged transverse vertical sectional view as seen in the direction of arrows from the line 2—2 of FIG. 1.
Figure 3:
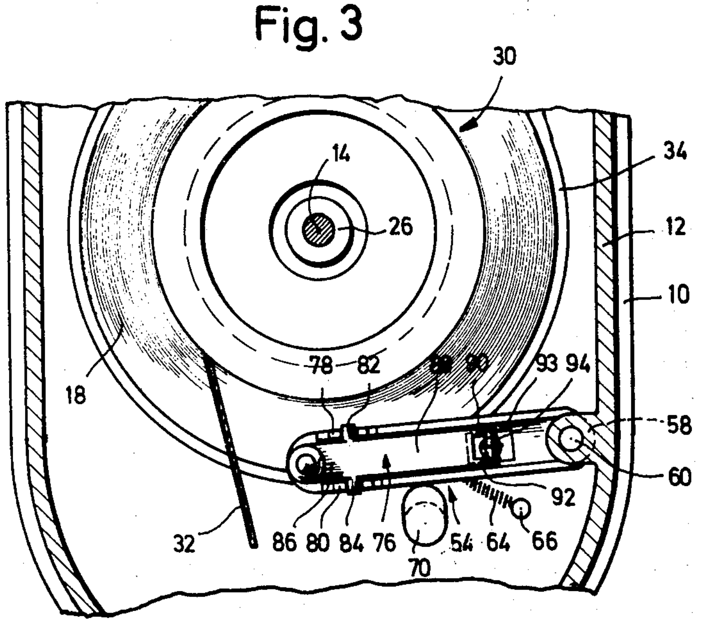
FIG. 3 is a fragmentary horizontal sectional view as seen in the direction of arrows from the line 3—3 of FIG. 2.

The outer end portion of the tone arm 54 (namely, the right-hand end portion, as viewed in FIG. 2 or 3) has a cylindrical bearing sleeve 58 (best shown in FIG. 2) having a bore whose diameter increases from the center toward both axial ends of the sleeve. This sleeve surrounds a post 60 whose ends are anchored in the base 10 and cover 12 and which is surrounded by a helical spring 72 tending to move the sleeve 58 upwardly, namely, toward the cover 12. The axis of the post 60 is parallel to the axis of the turntable 16 in the latter's normal (untilted) position. The stylus 62 extends downwardly from the other end portion of the tone arm 54. A helical return spring 64 is attached to a stud 66 in the base 10 and is further connected to a stud 68 on an intermediate portion of the arm 54 so that it tends to turn the arm in a counterclockwise direction, as viewed in FIG. 3. The starting position of the tone arm 54 is shown in FIGS. 1 and 2; this tone arm is permitted to move toward such starting position (under the action of the return spring 64) when the user of the phonograph exerts a pull on the cord 32 to tilt the shaft 14 to the phantom-line position of FIG. 1 and to thereby disengage the record 18 from the stylus 62. A preferably adjustable stop 70 is provided in the base 10 to arrest the tone arm 54 in its starting position. The aforementioned helical spring 72 on the post 60 for the bearing sleeve 58 normally maintains the latter in abutment with a stop shoulder 74 of the cover 12.

In accordance with a feature of the invention, the tone arm 54 is combined with a damping device including the aforementioned follower 76 which is mounted above the tone arm and is pivotable in the latter's bearing brackets 78, 80. To this end, the follower is provided with two coaxial trunnions 82, 84 which respectively extend into aligned recesses of the brackets 78, 80 at a point rather close to the stylus 62. The arm 86 of the follower 76 constitutes a bell crank lever one portion of which extends upwardly toward and abuts against the underside of the contact plate 52. The parts 86 and 52 are in mere point contact with each other; to this end, the upwardly extending portion of the arm 86 tapers conically toward the diaphragm 38 and is provided with a rounded tip. As shown in FIG. 2, the tip of the upwardly extending portion of the arm 86 engages the contact plate 52 at a point which is on an extension of or close to the axis of the stylus 62. The other or longer arm 88 of the follower 76 extends toward the bearing sleeve 58 of the tone arm 54. The free end of the arm 88 is bifurcated and its prongs 90, 92 are connected with a transversely extended bar 93 serving as a retainer for one end of a helical spring 94 whose lowermost convolution is connected to a stud 96 in the tone arm 54. The spring 94 forms part of the damping device and tends to pivot the follower 76 in a clockwise direction, as viewed in FIG. 2, so as to urge the tip of the arm 86 against the underside of the contact plate 52.

The ratio between the lengths of the arms 86, 88 of the follower 76 is selected in such a way that it at least approximates the ratio of the pressure with which the stylus 62 bears against the record 18 to the average bias (tension) of the spring 94. The reproduction of sound is further enhanced by the fact that the tip of the arm 86 engages the contact plate 52 in line with an extension of the axis of the stylus 62. This insures that mechanical vibrations which are produced by the modulation of sound groove or grooves on the record 18 are transmitted to the diaphragm 38 with maximum intensity. It was further found that the reproduction of sound is particularly satisfactory if the ratio of pressure between the arm 86 and contact plate 52 to the pressure between the stylus 62 and record 18 is about one to three. It was also found that the arm 88 of the follower 76 should be substantially longer than the arm 86; this insures that the point of engagement between the arm 86 and the contact plate 52 is close to the plane of the stylus 62. The follower 76 and the tone arm 54 are located in a common plane which is normal to the plane of the record 18.

The advantages of the just described sound reproducing apparatus are as follows: The energy which is effective on the tone arm 54 in a direction at right angles to the plane of the record 18 (and is due to changes in depth of the sound groove or grooves on the record) is transmitted to the diaphragm 38 by way of the trunnions 83, 84 substantially without any losses. However, if the position of the stylus 62 with reference to the record changes rather slowly, for example, due to wobbling of the record or during movement of the stylus away from the record prior to return movement of the tone arm to its starting position, the contact plate 52 of the diaphragm 38 serves as a fixed pivot and the follower 76 is caused to turn in a counterclockwise direction, as viewed in FIG. 2, against the opposition of the spring 94. Therefore, such excessive raising of the tone arm 54 cannot influence the diaphragm, i.e., only those vibrations are transmitted to diaphragm which are due to modulation (changes in depth) of the sound groove. The spring 94 can compensate for eventual tolerances in the construction and mounting of tone arm and follower so that the latter need not be adjusted once the toy phonograph is assembled and installed in a doll or the like.

If the phonograph is to be installed in a toy in such a way that the axis of the record 18 is vertical and remains vertical, the spring 94 may be replaced with other types of biasing means, for example, with a suitable weight. The spring 94 is normally preferred because it can produce a force which is independent of the selected orientation of the phonograph.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a sound producing apparatus, particularly for use with toys, a combination comprising a support; a record rotatably mounted on said support and having at least one sound groove of varying depth; motor means for rotating said record; a tone arm movably mounted at one end on said support means, said tone arm having a stylus on the other end arranged to track said sound groove and to vibrate said tone arm when said motor rotates said record, and a rigid projection projecting upwardly from said tone arm between the ends thereof and adjacent said other end thereof; a loud speaker mounted on said support; and means for transmitting vibrations from said tone arm to said loud speaker and comprising a rigid elongated follower supported between its ends on said projection for pivoting about a pivot axis and having a first short arm between one of its ends and said pivot axis and a second substantially longer arm between said pivot axis and the other end thereof, and biasing means between said other end of said follower and said tone arm for biasing said one end of said follower into engagement with said loud speaker whereby said follower will transmit to said loud speaker substantially only those vibrations which are due to movement of said stylus in response to changes in the depth of the tracked sound groove while transmission of slow vibrations due to wobbling of the record will be substantially prevented.

2. A combination as defined in claim 1, wherein said biasing means comprises a spring.

3. A combination as defined in claim 1, wherein said tone arm and said follower are located in a common plane.

4. A combination as defined in claim 1, wherein said follower engages said loudspeaker at a point which is at least closely adjacent to an extension of the axis of said stylus.

5. A combination as defined in claim 1, wherein said tone arm comprises a pair of aligned bearings and said follower comprises trunnions rotatably accommodated in said bearings.

6. A combination as defined in claim 1, wherein said stylus bears against the record with a first force and said biasing means urges said follower against said loudspeaker with a second force, the ratio of the lengths of said first and second arms being at least substantially equal to the ratio of magnitudes of said first and second forces.

7. A combination as defined in claim 1, wherein said stylus bears against the record with a first force and said follower is biased against said loudspeaker with a second force, the ratio of said first and second forces being about three to one.

8. A combination as defined in claim 1, wherein the length of said first arm being a small fraction of the length of said second arm.

9. A combination as defined in claim 1, wherein said tone arm has a first end portion which is turnable on said support about an axis which is substantially parallel to the axis of said record and a second end portion provided with said stylus, said loudspeaker comprising a diaphragm and a contact plate adjacent to but spaced from the second end portion of said tone arm.

10. A combination as defined in claim 9, wherein said first arm is in point contact with said contact plate and the location of said point contact is at least closely adjacent to an extension of the axis of said stylus, and further comprising means for yieldably biasing said contact plate against said first arm.

* * * * *